United States Patent [19]
Bergetz

[11] Patent Number: 5,487,524
[45] Date of Patent: Jan. 30, 1996

[54] MOUNTING ASSEMBLY WITH FORCED ABSORPTION CHARACTERISTICS

[75] Inventor: Carl A. Bergetz, River Forest, Ill.

[73] Assignee: Peerless Industries, Inc., Melrose Park, Ill.

[21] Appl. No.: 230,893

[22] Filed: Apr. 21, 1994

[51] Int. Cl.⁶ .................................................. F16M 13/00
[52] U.S. Cl. ........................... 248/613; 248/343; 267/33
[58] Field of Search .................................. 248/610, 611, 248/612, 613, 343, 342, 344, 278; 267/33

[56] References Cited

U.S. PATENT DOCUMENTS

| 645,057 | 3/1900 | Ayers et al. | 248/613 |
|---|---|---|---|
| 2,147,660 | 2/1939 | Loewus | 248/613 |
| 5,009,386 | 4/1991 | Berger et al. | 248/613 |
| 5,127,617 | 7/1992 | Bergetz | 248/278 |

FOREIGN PATENT DOCUMENTS 0956620  10/1974  Canada .................................. 248/612

OTHER PUBLICATIONS

Vantage Point Products Corp.–Jun., 1993.

Primary Examiner—Ramon O. Ramirez
Attorney, Agent, or Firm—Lockwood Alex Fitzgibbon and Cummings

[57] ABSTRACT

A mounting assembly for an electrical appliance such as television receiver or the like that has a mounting arm that extends from a mounting bracket affixed to a support surface includes a forced or vibration absorption assembly. This assembly includes an interface member which separates the mounting arm from the mounting bracket and mounting surface and absorbs forces to vibrations and other dynamic loading upon the structure or mounting assembly. The interface member is compressible and permits the mounting arm to have an articulation angle of much greater than would be obtained by a rigid mounting arm rigidly attached to a mounting bracket.

24 Claims, 3 Drawing Sheets

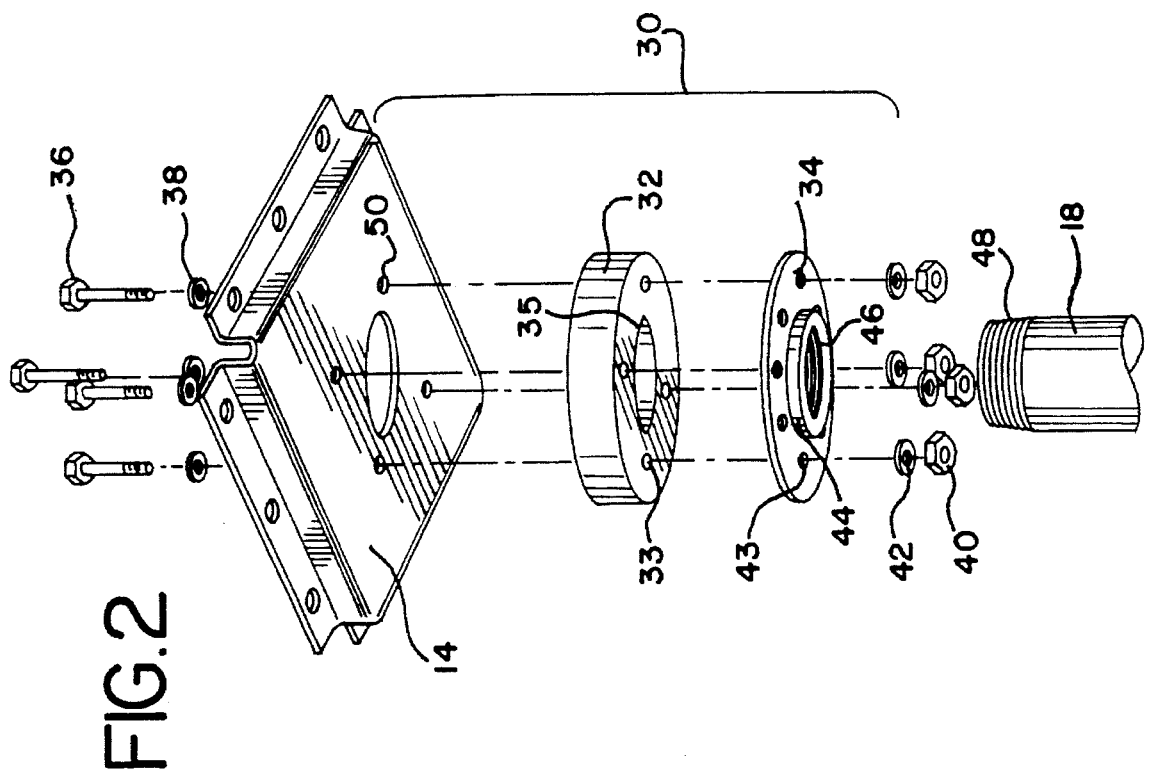
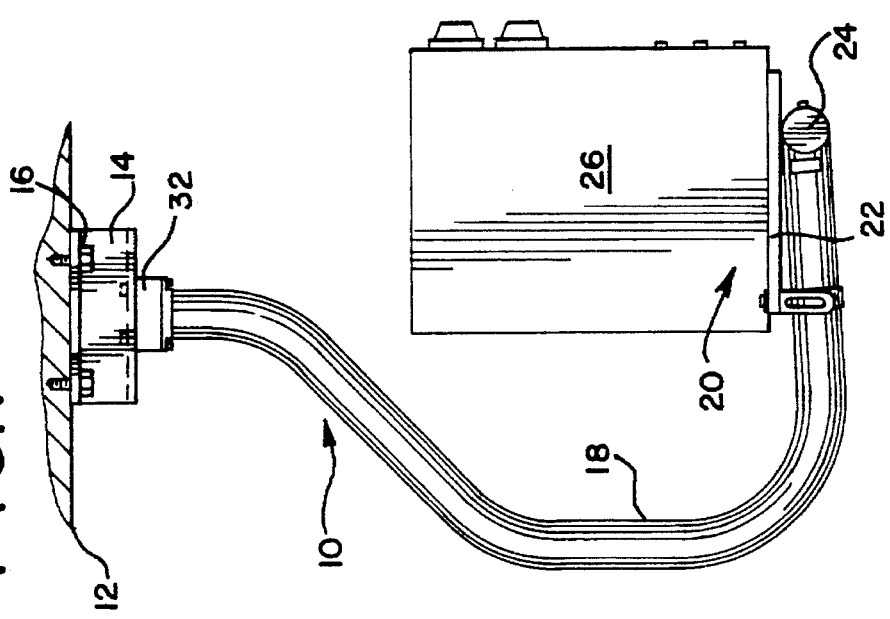

MOUNTING ASSEMBLY WITH FORCED ABSORPTION CHARACTERISTICS

BACKGROUND AND SUMMARY OF THE PRESENT INVENTION

The present invention relates generally to devices for mounting televisions and other appliances to structures, and more particularly, relates to an assembly which absorbs vibrations and forces imparted to such structures to prevent them from being transferred to the mounting devices.

Televisions and other electrical appliances are often mounted to walls and ceilings in various buildings by way of mounting devices. These appliances are commonly mounted to a structure by way of an arm which extends down from a mount on a wall or ceiling. When the appliance is in place, the entire mounting assembly often may act as an extension of the structure. If the structure is subjected to vibrations or to dynamic loading, the structure will transmit the vibrations or loading to the mounting assembly.

The appliance mounting assemblies of the prior art are usually either rigidly or rotatably attached to the building structure. In the instance of a rigid attachment, the appliance and mounting assembly will directly receive the vibrations and forces imparted to the building. For instances of rotatable attachment, the mounting assembly may not receive all of the vibration and forces due to dynamic loading because of the mounting assembly's ability to rotate within a mounting bracket, but nevertheless the rotating member may then independently itself move in response to the vibration and forces. This independent movement may jeopardize the integrity of the mounting assembly to the structure and causes the mounting assembly to disassociate itself from the structure and fall away from the structure. This calamity may occur-when the mounting assembly arm breaks the mounting bracket in a manner not foreseen. Apart from the obvious damages that this separation may force to the appliance, in structures where the appliance is mounted over head, this dissociation will present a hazard to individuals that may be positioned underneath the appliance and mounting assembly.

Vibrations and dynamic loading which cause these problems may be caused in a number of ways. The most obvious example of dynamic loading to a structure is that of an earthquake. In industrial settings, in which perhaps television monitors are mounted overhead throughout a building for security purposes as in a warehouse or other plant facility, vehicles such as forklifts or cranes may collide with certain structural or components of the building such as support columns. Where the column supports a roof truss member, the impact may also produce dynamic force that travel through the truss to which the appliance and mounting assembly. Lastly, the mounting assembly may itself receive a direct impact such as from a collision with a vehicle as described above which although may not be enough of an impact to damage the mounting assembly or appliance, it may move of the mounting assembly in a manner and magnitude to separate the mounting assembly from the structure and cause damage.

The present invention is directed to an appliance mounting assembly which presents a solution to the aforementioned problems. In doing so, it utilizes a minimum number of parts to effectively isolate the mounting assembly and the appliance supported thereon from the structure and to absorb, or dampen, to the extent possible, forces imparted to the mounting assembly, whether those forces begin in the structure or in the mounting assembly. In this regard, the present invention effectively supports the appliance while uncoupling the mounting assembly from the building structure in the force transfer sense.

In a mounting assembly incorporating the principles of the present invention, a mounting arm, or carrier member, holds a support tray upon which is mounted an appliance such as a television receiver. The arm extends down from a mounting bracket affixed to the structure. A damping member is interposed between the mounting bracket and the arm to dampen vibrations which may occur in the building and to absorbs forces which may be imparted to the building and to reduce the amount of force which may be transferred from either the building to the mounting arm and appliance or from the mounting arm and appliance to the structure.

Accordingly, it is a general object of the present invention to provide an improved mounting assembly for an electrical appliance, such as a television monitor or the like, which includes a force absorbing interface disposed between the appliance and the mounting surface.

Another object of the present invention is to provide a mounting assembly for television receivers or other electrical appliances having an arm which extends from a mounting bracket which interconnects the appliance to a structure, the mounting assembly including load absorbing means disposed between the arm and the mounting bracket for absorbing vibrations and forces imparted to the structure or appliance, the load absorbing means including a flexible, resilient member.

A further object of the present invention is to provide a kit of parts for use in converting an existing appliance mounting assembly into one which has improved vibration and force absorption characteristics, in which the kit of parts includes an elastic interfacial member and two attachment members, the interfacial member being held between the attachment members on opposing sides thereof, the attachment members including means for attachment to a mounting bracket and mounting arm, respectively.

Yet another object of the present invention is to provide a mounting assembly for a television, monitor or other large appliance in which the mounting assembly supports the appliance from a structural element of a building by way of a support member, the mounting assembly including a force absorbing interface disposed between the building structure element in the appliance support member, the interface including a force absorbing member incorporating any of an elastomeric member, one or more springs or a hydraulic damping member which absorbs forces imparted to the building structure and which permits an increase in the articulation of the appliance with respect to the mounting surface of the building structure element without overloading or overstressing the amounting bracket.

These and other objects, features and advantages of the present invention will be apparent from a reading of the following detailed description, taken in conjunction with the accompanying drawings therein like reference numerals refer to like parts.

BRIEF DESCRIPTION OF THE DRAWINGS

In the course of this detailed description, reference will be made to the attached drawings in which:

FIG. 1 is an elevational view of an appliance mounting assembly affixed to a structure illustrating the environment in which the present invention is used;

FIG. 2 is an exploded perspective view of a mounting assembly constructed in accordance with the principles of the present invention suitable for attachment to a planar building support surface;

DETAILED DESCRIPTION OF THE INVENTION

Figure 4:
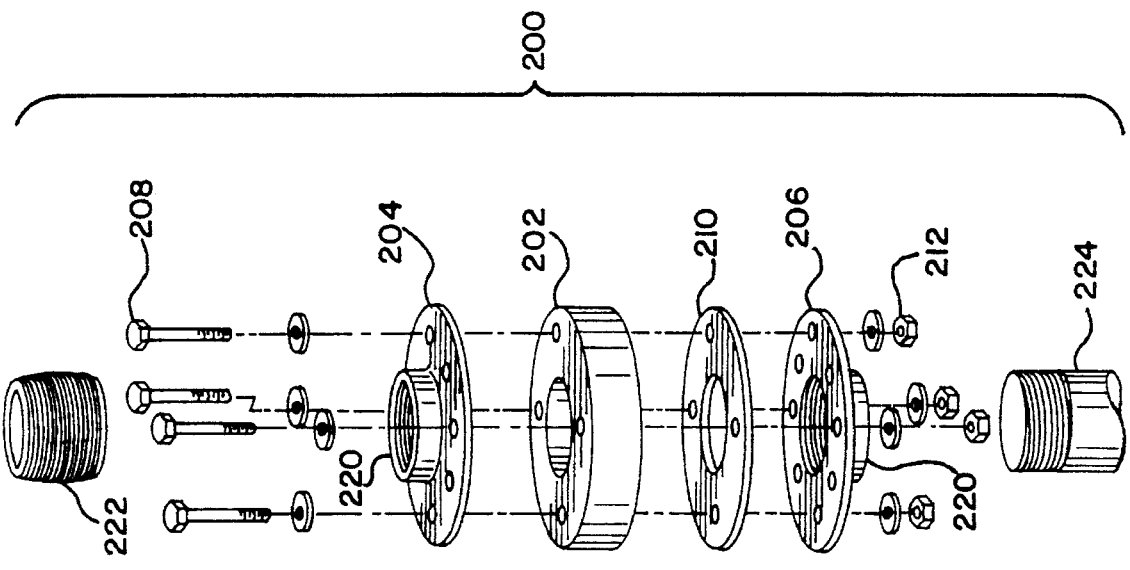
FIG. 4 is an exploded perspective view of another embodiment of the present invention illustrating a kit of parts useful in converting an existing mounting assembly into a mounting assembly of the present invention.

FIG. 1 illustrates one embodiment of the mounting assembly 10 constructed in accordance with the present invention. The mounting assembly 10 is shown in place in a typical installation environment in which the mounting assembly is attached to a building support surface, shown as a concrete ceiling 12, by means of a mounting box, or bracket 14, which is bolted to the support surface 12 by way of bolts 16.

The mounting assembly 10 includes a support arm member 18 formed from structural tubing which extends downwardly and outwardly to a support area 20 of the arm member 18 which includes a planar support tray 22 and a transverse cross member 24 which supports an appliance, such as television receiver 26. Specific details on the arm 18 illustrated are described in my U.S. Pat. No. 5,127,617, issued Jul. 7, 1992. The overall structure of the arm illustrated forms no part of the present invention and is presented merely as an example of the environment in which the present invention operates. Additionally, FIG. 1 only illustrates the present invention in use with one appliance. The present invention may be used with mounting devices which support multiple arrays of appliances which are particularly useful in multimedia presentations.

FIG. 2 illustrates the structural details of the connection disposed between the arm member 18 and the building support surface 12 in accordance with the present invention. As seen in FIGS. 1 and 2, the mounting assembly 10 includes a means 30 for absorbing forces imparted to either the support surface 12 or the mounting assembly 10. The force absorbing means is illustrated as an elastic interface member 32 interposed between the mounting bracket 14 and the support arm 18. The interface member 32 is held in place between the arm 18 and mounting bracket 14 by a retention flange 34 having a central hub portion 44 which extends out from the flange and includes a series of internal threads 46. This threaded hub portion 44 receives a threaded end 48 of a support arm 18. A series of elongated members, which are illustrated as threaded retention bolts 36, retain the elastic interface member 32 in place between the mounting bracket 14 and the support arm flange 34. These bolts 36 extend through openings 43 formed in the flange 34, openings 33 formed in the interface member 32 and openings 50 formed in the mounting bracket 14. Washers 38 and 42 may be provided to separate the bolt heads and retention nuts 40 from their mating surfaces of the mounting bracket 14 and flange 34.

The elastic interface member 32 provides an elastic or resilient interface between the mounting arm 18 by way of the flange 34 and the mounting bracket 14, either of which may move in response to dynamic loading imparted to either the building or the mounting assembly 10. Because the interface member 32 is formed from an elastic material, such as an elastomer, it may readily be compressed by forces imparted to the building structure or the mounting assembly 10.

Figure 5:
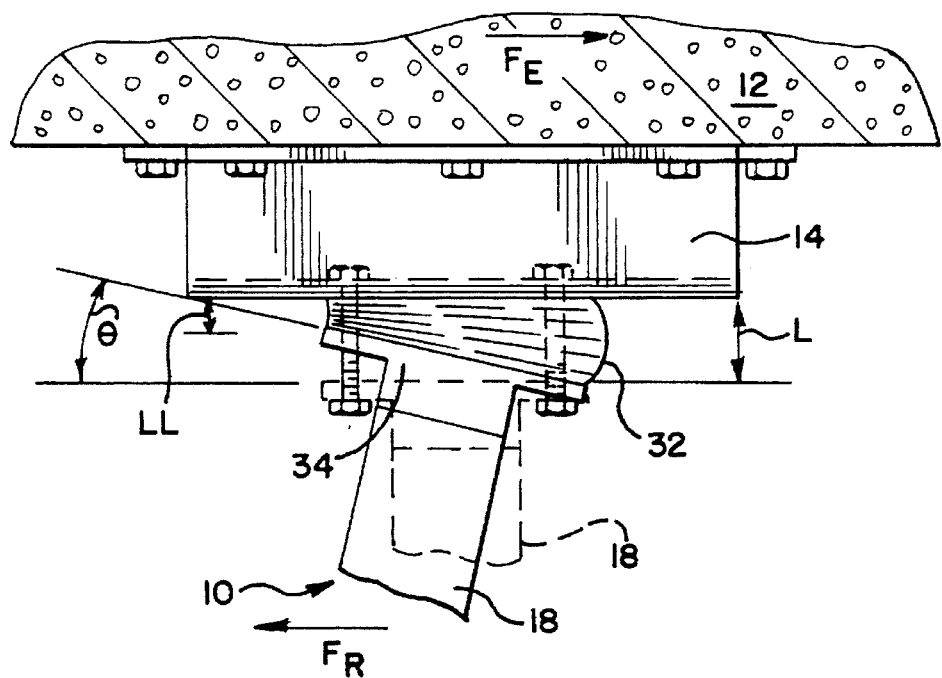
FIG. 5 is a diagrammatic view of the operation of a mounting assembly of the present invention.

An illustration of such movement is shown in FIG. 5 wherein a mounting arm 18 is attached to a building support surface 12 by the mounting bracket 14. When the building undergoes a dynamic loading or when a vibration is induced therein, such as which may occur during an earthquake, as represented by the force arrow $F_e$, the support surface 12 may move in the direction of that force $F_e$. That force and movement will produce an opposite reaction and movement in the mounting assembly 10 as represented by the force arrow $F_r$. The mounting assembly 10 moves in response to this force as illustrated, and causes the retention flange 34 of the mounting arm to compress the far side of the interface member 32. The range of movement, or articulation, of the mounting assembly 10 is represented by $\theta$. This angle is from the horizontal reference line defined by the retention flange horizontal surface 34 which is shown in phantom in FIG. 5 when the mounting assembly is at rest to the new reference line defined by the retention flange 34 at its maximum movement and articulation. In this movement, the interface member 32 will be compressed and its relative length on the far side, that is the side in the direction of the reaction movement of the mounting assembly, from a length L down to a length LL, as illustrated. Because the interface member 32 is unconfined, the elastomer bulges outwardly on the near side as illustrated.

After the initial compression, the elastomeric material will tend to return to its original state and in doing so, will serve to dampen forces or vibrations which would be transferred to the mounting assembly by external loading on a building structure, as well as those independently induced into the mounting assembly such as by collision of an object with the mounting assembly. It has been observed that with an elastomeric interface member 32 having a durometer of 60, an articulation $\theta$ of between 20° to 30° occurs. These articulation angles are much greater than rigid mounting assemblies and reduce the likelihood of the mounting element itself forcing the mounting bracket to pull loose from its support structure.

The extent and range of the articulation angle will be governed by not only the durometer of the elastomer but also by its installation length. Preferred performance results had been obtained by using an interface member having a length of approximately one and a half inches and a durometer of 60. Thus, it can been seen that the present invention by way of the interface member 32 effectively acts as a shock absorber or snubber and absorbs shock loading and dampens vibrations which might otherwise be transferred directly to the mounting assembly, thereby effectively isolating or uncoupling the appliance and mounting assembly from the building structure with respect to the transfer of forces therebetween.

Figure 3:
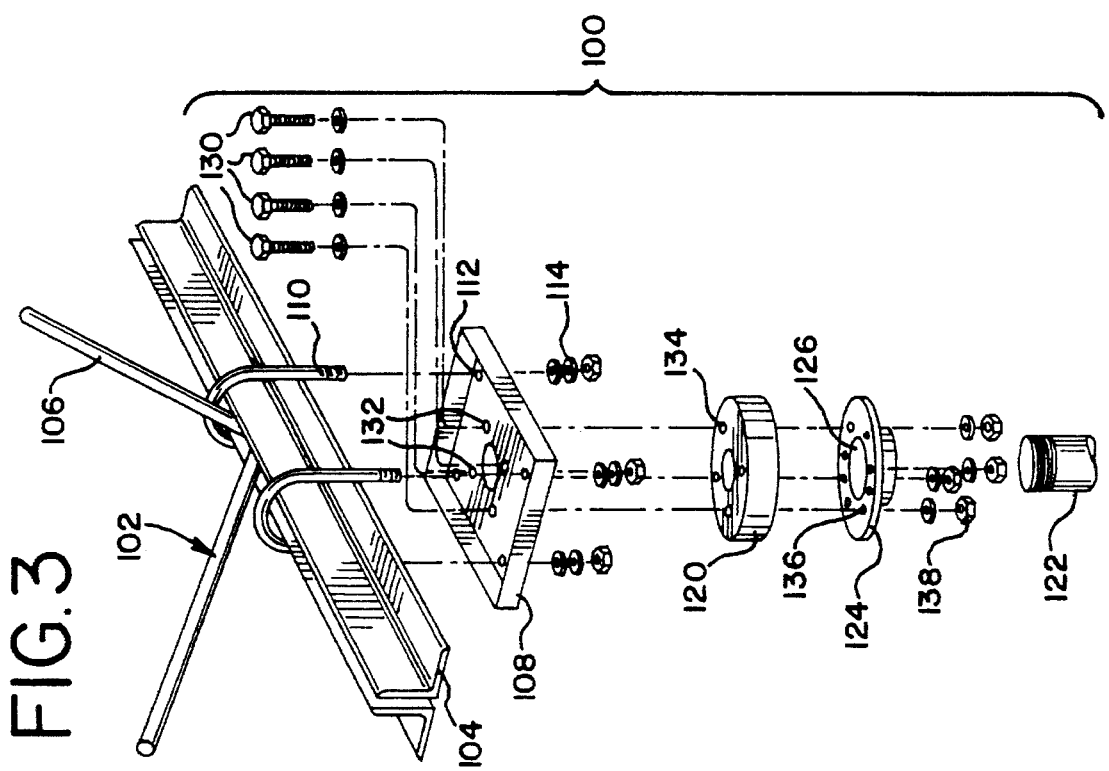
FIG. 3 is a exploded perspective view of an alternative embodiment of a mounting assembly constructed in accordance with the principles of the present invention is suitable for attachment to building truss member.

FIG. 3 shows another embodiment on the mounting assembly 100 constructed in accordance with the principles of the present invention. The mounting assembly 100 is shown in an environment in which the mounting assembly 100 is attached to a building structural element such as roof truss 102. The roof truss 102 is a conventional one having channel members 104 defining respective top and bottom sections of the truss and inner connected by diagonal brace members 106. The roof truss 102 typically stands between bearing walls or columns of a building structure.

A mounting bracket 108 is attached to the lower truss member 104 by means of pair of U-bolts 110 which project through openings 112 of the mounting bracket 108 and are secured thereto by a series of washers and nuts 114. A force-absorbing interface member 120 is interposed between the mounting bracket 108 and the mounting arm 122 of the mounting assembly 100 and supported on a retention flange 124. Similar to the embodiment described in FIGS. 1 and 2, the retention flange 124 has a threaded hub portion 126 which receives the mounting arm 122 therein. The mounting arm 122 may be attached to the retention flange in a variety of ways such as by way of a set screw (not shown), or it may be welded to the retention flange.

A plurality of connection bolts 130 extend through openings 132 in the mounting plate 108 and like openings 134, 136 in the interface member 120 and retention flanges 124 respectively. Nuts 138 or other suitable fasteners are used to complete the connection between these elements and also provide a means for "preloading" the interface member 120 to a predesired level. When so compressively preloaded, the force absorbing and damping effect obtained from the interface member is increased in that the side of the interface member opposite the movement of the mounting arm during a dynamic loading condition will tend to move away from the mounting bracket and the preloading will momentarily dissipate.

FIG. 4 illustrates another embodiment 200 incorporating the principles of the present invention which is particularly suitable for retrofitting or converting an existing mounting assembly into a mounting assembly having the force isolation and absorption characteristics of the present invention. In this embodiment 200, the interface member 202 is held and placed between 2 retentions flanges 204 and 206 by means of a plurality of fasteners such as bolts 208. A metallic reinforcement washer 210 may be placed in contact with either of the two retention flanges 204, 206 to reinforce the overall assembly. Nuts 212 are provided to secure the fasteners together through the retention flanges and interface member 202. Both of the flanges have threaded central hub portions 220 which may respectively receive threaded pipe ends of an extension member 222 and of the mounting arm 224. The extension member 222 permits the assembly to be secured to an existing mounting bracket having a threaded hub portion.

Figure 6:
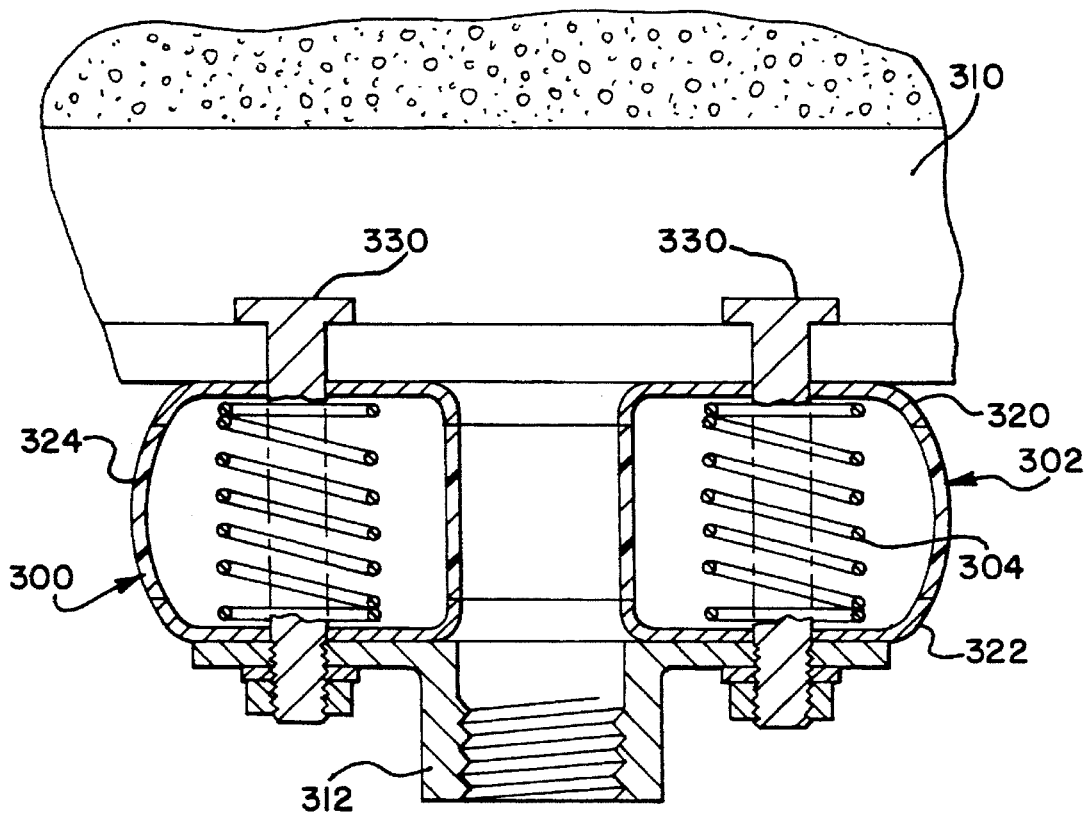
FIG. 6 is a sectional view of another embodiment of a mounting assembly of the present invention.

FIG. 6 illustrates yet another embodiment of the present invention in which the embodiment 300 utilizes a spring-biased, compressible interface member 302 which utilizes a plurality of springs 304 as its active force damping and absorption element. In this embodiment, the interface member 302 is interposed between a mounting bracket 310 and mounting arm flange 312. The interface member 302 includes two opposing cap portions, illustrated as top cap member 320 and bottom cap member 322 which contain a plurality of compression springs 304 arranged therebetween. Because the interface member 302 undergoes compression, the top and bottom cap members 320, 322 are interconnected by suitable, flexible resilient sidewalls, or skirts 324, to keep dirt and debris out of the springs 304. Attached bolts 330 extend through the mounting bracket 310, interface member 302 and retention flange 312 to hold the components together. These bolts 330 may also be used to apply a preload to the structure, if desired.

It will be understood that other suitable constructions may be utilized for the interface member and still obtain the benefits of the present invention as is represented by the embodiments described hereinabove. Examples of such an interface member would be member containing either fluid filled damping chambers or formed from universal joints, both of which would serve to uncouple the mounting assembly and appliance from the structure. Thus, it would be appreciated if the embodiments of the present invention have discussed herein or merely illustrative of a few applications of the principles of the invention. Numerous modifications may be made by those skilled in the art without departing from the true spirit and scope of the invention.

I claim:

1. A mounting assembly for mounting electrical appliances, such as television sets to a building comprising:

mounting means adapted for attachment to a building support surface, an arm member adapted for attachment to the mounting means, the arm member having means for supporting said appliance in a spaced-apart relationship from the building support surface, said mounting assembly including force absorbing means disposed between and in contact with said mounting means and said arm member, whereby said force absorbing means effectively dampens forces imparted upon the building and present in said building support surface, said force absorbing means being a compressible interface member having an axial length sufficient to permit angular articulation of said mounting arm with respect to said mounting means, said mounting means, interface member and mounting arm being held together by at least one fastener member extending therethrough, the fastener member being adjustable so as to permit the application of a preload to said interface member.

2. The mounting assembly of claim 1, wherein said interface member is formed from an elastomeric material.

3. The mounting assembly of claim 2, wherein said interface member elastomeric material has a durometer of approximately 60.

4. The mounting assembly of claim 1, wherein said force-absorbing means includes a spring-loaded interface member having at least one spring member axially aligned with an axis of said mounting arm.

5. The mounting assembly of claim 1, wherein said force absorbing means includes an interface member formed from a compressible material and said mounting arm includes a flange member attached to one end thereof, the flange member defining a contact surface which abuts said interface member.

6. The mounting assembly of claim 5, wherein said mounting means, interface member and mounting arm are held together in contact by a plurality of fasteners extending through said mounting means, interface member and mounting arm flange member, said fasteners being adjustable so as to permit the application of a preload to said interface member.

7. The mounting assembly of claim 1, wherein said force absorbing means is unconfined.

8. The mounting assembly of claim 4, wherein said spring member is axially confined between axial end portions of said spring-loaded interface member and said spring member includes two opposing ends which contact said axial end portions.

9. The mounting assembly of claim 1, wherein said force absorbing means includes a compressible interface member, the interface member having an engagement plate which engages said arm member, said mounting assembly further including at least one retention member extending through said interface member between said mounting means and the engagement plate, the retention member retaining said interface member within said mounting means.

10. The mounting assembly of claim 9, wherein said retention member includes means for applying a compressive preload force to said interface member.

11. A mounting assembly for supporting an appliance from a mounting surface of a structure, the mounting assembly comprising, in combination:

a mounting bracket adapted to be fastened to the structure mounting surface to secure said mounting assembly to said mounting surface;

a support arm extending from said mounting bracket to a support member;

a force-absorbing member interposed between said mounting means and said support arm which provides a force-absorbing interface between said structure mounting surface of said support arm; and, at least one elongated retention member extending from said mounting bracket to said support arm through said force-absorbing member.

12. The mounting assembly of claim 11, wherein the force absorbing member includes an annular ring formed from a compressible, resilient material and having an axial length sufficient to permit articulation of the support arm relative to said mounting bracket when at least a portion of said annular ring is compressed.

13. The mounting assembly of claim 11, wherein the force absorbing member includes a spring-biased ring member having at least one compression spring disposed therein and oriented generally axially parallel with an axis of said support arm.

14. The mounting assembly of claim 11, wherein said support arm includes a support surface which is disposed generally parallel to an opposing surface of said mounting bracket and which supports said force absorbing member between said mounting arm and said mounting bracket.

15. The mounting assembly of claim 11, wherein said force-absorbing member is formed from an elastomeric material and has at least one opening aligned with said support arm which receives said retention member.

16. The mounting assembly of claim 11, wherein said support arm includes a flange member and said force-absorbing member is disposed between said mounting bracket and said flange member, said retention member retaining said force-absorbing member between said mounting bracket and said flange member.

17. A kit of parts for use in converting an appliance mounting assembly having a support arm and a mounting bracket secured to a building support surface into an appliance mounting assembly having a force-absorbing component, comprising:

a compressible interface member having first and second opposing contact surfaces, first and second flange members which engage said interface member respective first and second contact surfaces, and means for retaining said interface member between said first and second flange members, said first flange member including a portion which engages said support arm when said kit is assembled and said second flange member including a portion which engages said mounting bracket when said kit is assembled, whereby, when said kit is assembled, said interface member is disposed between said mounting bracket and said support arm and compresses in response to forces exerted upon said support arm or upon said building.

18. A kit according to claim 17, wherein said retaining means includes a plurality of retention members extending between said mounting brackets and said support arm, the retention members engaging said first and second flange members.

19. A mounting assembly for supporting an appliance from a mounting surface of a structure, comprising:

a mounting bracket for engaging the structure mounting surface, an appliance support arm extending between the mounting bracket and the appliance, the support arm having a contact surface thereon generally opposing said mounting bracket and an interface member interposed between said mounting bracket and said support arm contact surface, the interface member being compressible between said mounting bracket and said support arm in response to forces exerted upon said structure as well as forces exerted upon said appliance, said mounting assembly further including at least one retention member retaining said interface member in place between said mounting bracket and said support arm.

20. The mounting assembly of claim 19, wherein said interface member is formed from a solid elastomeric material and includes at least one axial opening which receives said retention member therein.

21. The mounting assembly of claim 19, wherein said support arm contact surface is defined on a flange member separately formed from said support arm.

22. A mounting assembly for supporting an appliance from a mounting surface of a structure, the mounting assembly comprising, in combination:

a mounting bracket adapted to be fastened to the structure mounting surface to secure said mounting assembly to said mounting surface;

a support arm extending from said mounting bracket to a support member;

a force-absorbing member interposed between said mounting means and said support arm which provides a force-absorbing interface between said structure mounting surface of said support arm;

at least one elongated retention member extending from said mounting bracket to said support arm through said force-absorbing member, said force-absorbing member being formed from an elastomeric material and having at least one opening aligned with said support arm which receives said retention member.

23. A mounting assembly for mounting electrical appliances, such as television sets, to a building comprising:

mounting means adapted for attachment to a building support surface, an arm member adapted for attachment to the mounting means, the arm member having means for supporting said appliance in a spaced-apart relationship from the building support surface, said mounting assembly including unconfined force absorbing means disposed between said mounting means and said arm member, whereby said force absorbing means effectively dampens forces imparted upon the building and present in said building support surface.

24. A mounting assembly for mounting electrical appliances, such as television sets, to a building comprising:

mounting means adapted for attachment to a building support surface, an arm member adapted for attachment to the mounting means, the arm member having means for supporting said appliance in a spaced-apart relationship from the building support surface, said mounting assembly including force absorbing means confined between said mounting means and said arm member, whereby the force absorbing means effectively dampens forces imparted upon the building and present in said building support surface, said force absorbing means having two opposing surfaces which respectively contact said mounting means and said arm member said force absorbing means including an interface member formed from a compressible material and said mounting arm including a flange member attached to one end thereof, the flange member defining at least a portion of a contact surface which abuts and contacts said interface member, said mounting assembly further including means for holding said mounting means, arm member and force-absorbing means together such that said force-absorbing two opposing surfaces are in contact with said mounting means and said arm member.

* * * * *

UNITED STATES PATENT AND TRADEMARK OFFICE
CERTIFICATE OF CORRECTION

PATENT NO. : 5,487,524

DATED : Jan. 30, 1996

INVENTOR(S) : Carl A. Bergetz

It is certified that error appears in the above-identified patent and that said Letters Patent is hereby corrected as shown below:

Title: MOUNTING ASSEMBLY WITH FORCE ABSORPTION CHARACTERISTICS

Signed and Sealed this

Twenty-first Day of May, 1996

Attest:

BRUCE LEHMAN

Attesting Officer      Commissioner of Patents and Trademarks